Feb. 28, 1956 M. H. ROSKE 2,736,047
SEAM PRESSING AND TAPING MACHINES
Filed July 24, 1952 9 Sheets-Sheet 1

Inventor
Milton H. Roske
By his Attorney

Feb. 28, 1956  M. H. ROSKE  2,736,047
SEAM PRESSING AND TAPING MACHINES
Filed July 24, 1952  9 Sheets-Sheet 3

*Inventor*
Milton H. Roske
By his Attorney

Feb. 28, 1956  M. H. ROSKE  2,736,047
SEAM PRESSING AND TAPING MACHINES
Filed July 24, 1952  9 Sheets-Sheet 5

Inventor
Milton H. Roske
By his Attorney

Inventor
Milton H. Roske
By his Attorney

United States Patent Office 2,736,047
Patented Feb. 28, 1956

2,736,047

SEAM PRESSING AND TAPING MACHINES

Milton H. Roske, Malden, Mass., assignor to United Shoe Machinery Corporation, Flemington, N. J., a corporation of New Jersey Application July 24, 1952, Serial No. 300,574

3 Claims. (Cl. 12—59.5)

This invention relates to machines for use in the manufacture of shoes and it is herein disclosed as embodied in a machine for pressing and taping the back seams of shoe uppers. The illustrated machine includes means similar to those disclosed in United States Letters Patent No. 2,513,464, granted July 4, 1950, upon the application of Harry D. Elliott for effecting a preliminary pressing of the back seams of shoe uppers as the uppers pass through the machine, and the illustrated machine further includes means for applying adhesive tape upon the back seams while effecting a further pressing operation. The illustrated machine is provided with a device for measuring the tape as the tape is drawn from a reel by the moving workpiece, and with a cutter actuated by the measuring device to sever the tape upon the passage of a predetermined length of tape. The combination in a taping machine of a measuring device and a cutter actuated thereby is not broadly new, as evidenced by United States Letters Patent No. 2,077,797, granted April 20, 1937 upon the application of Raymond J. Holmes. The cutter of the Holmes machine is operated by a spring-loaded mechanism which must be reset by a treadle.

It is an object of the present invention to provide a tape applying machine which requires no manual operation other than the introduction of a workpiece. In accordance with this object, a feature of the invention consists in the provision of electromagnetic means, more particularly a solenoid, for operating the cutter of the illustrated machine. The solenoid is energized by a circuit which includes a switch under control of the tape measuring device. The solenoid disclosed herein resets automatically and without need of a treadle.

These and other features of the invention, including certain details of construction and combinations of parts, will be described in connection with an illustrative machine and pointed out in the appended claims.

Referring now to the accompanying drawings.

Figure 19:
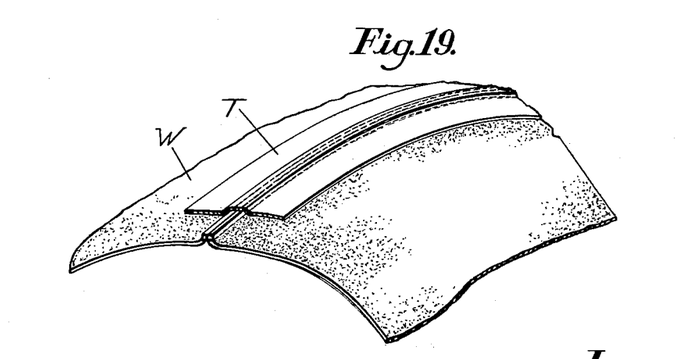
Fig. 19 is an angular view of a workpiece after the seam has been pressed and tape has been applied by the machine.

The purpose of the illustrated machine is to flatten a seam joining two pieces of material and to apply an adhesively coated strip of tape over the seam. Such a seam, as shown in Fig. 19, may be the usual back seam which joins the two quarters of a shoe upper. The two quarters thus joined constitute a workpiece, indicated by the reference character W, and the tape which the machine applies over the seam is indicated by the reference character T.

Figures 1, 2, 3:
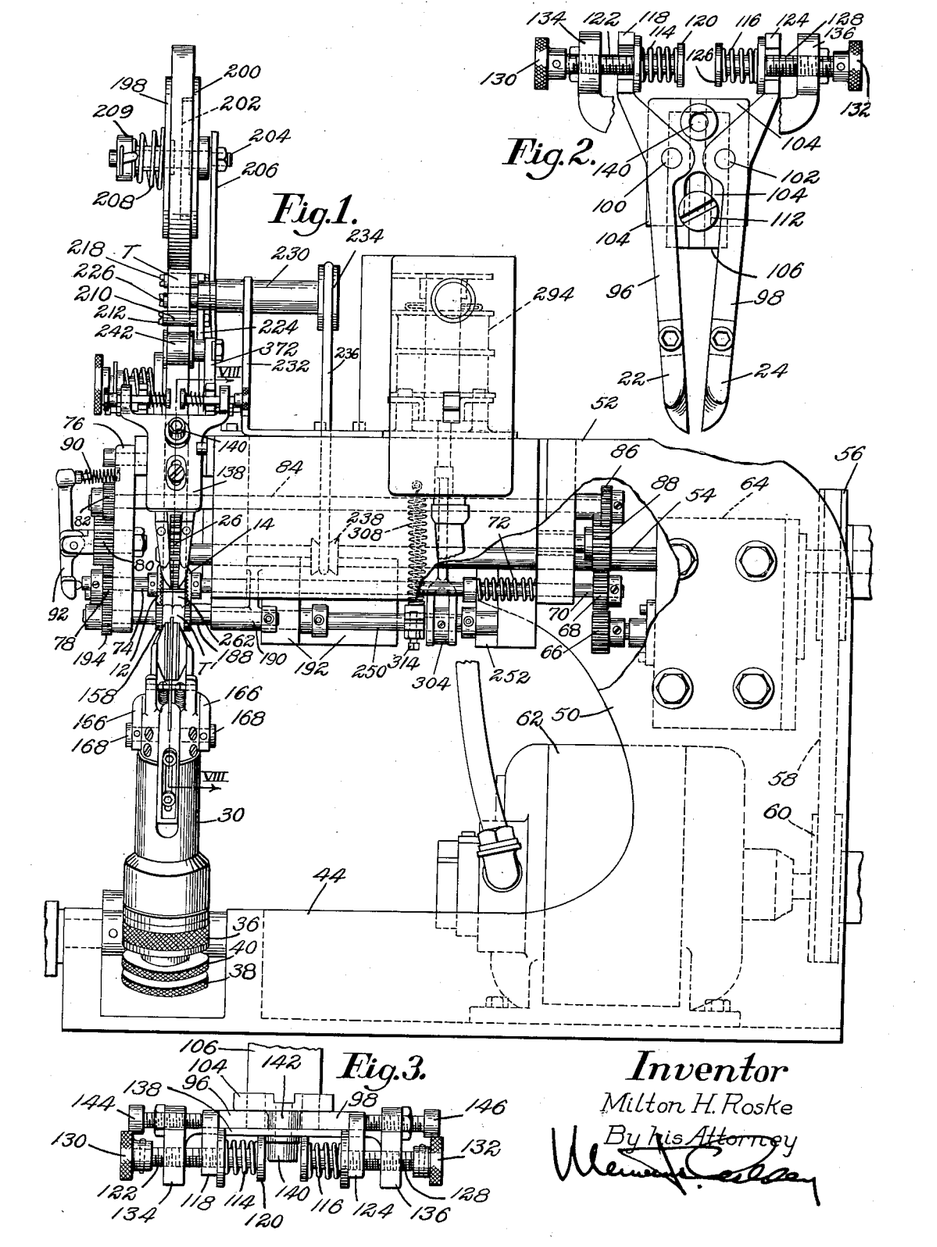
Fig. 1 is a front elevation of an illustrative machine embodying the invention.
Fig. 2 is a view of parts of the machine shown in Fig. 1 looking in the direction of the arrow II on Fig. 4.
Fig. 3 is a view of the parts shown in Fig. 2 as seen looking in the direction of the arrow III on Fig. 4.
Figures 8, 9:
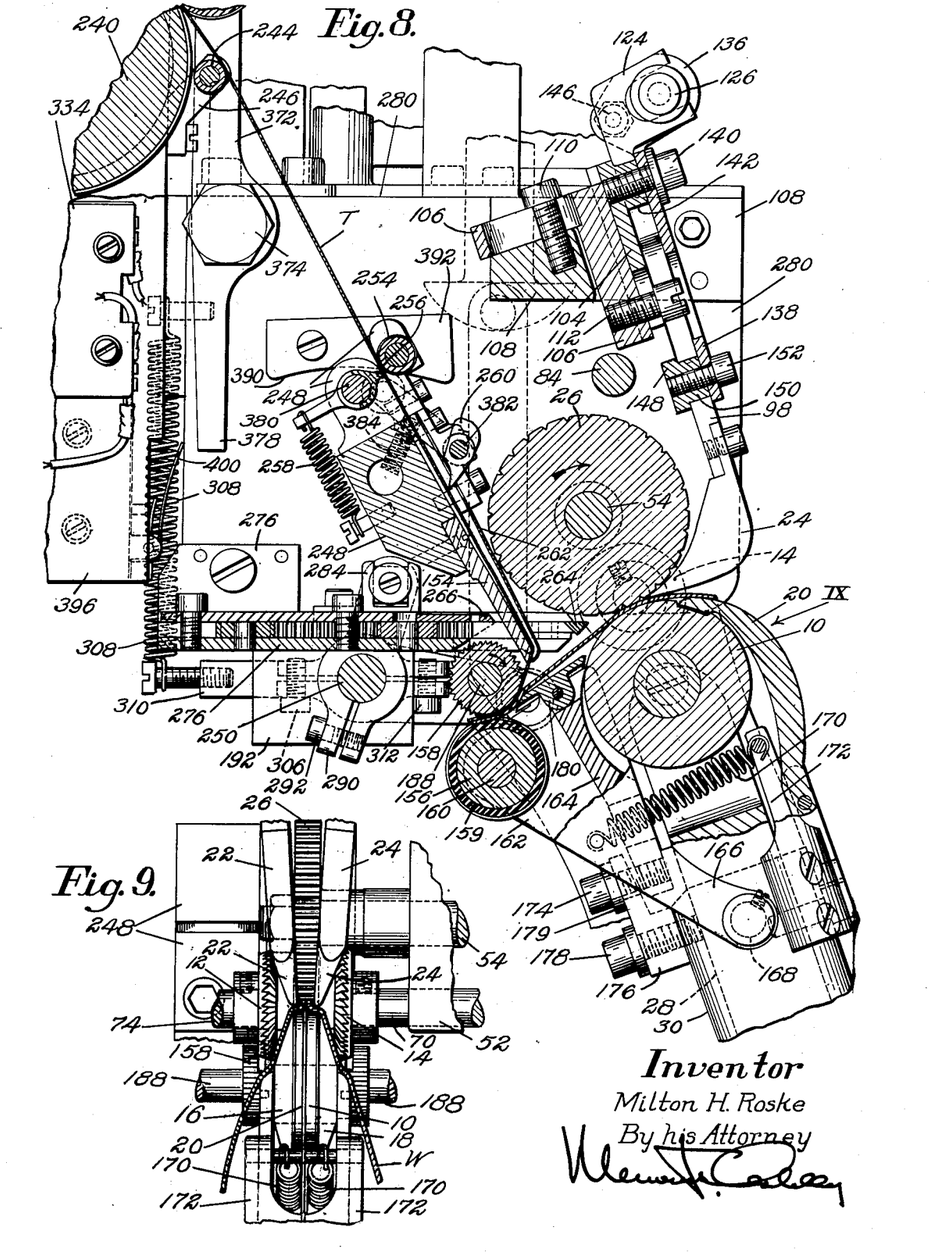
Fig. 8 is a vertical section of the machine taken on the line VIII—VIII of Fig. 1, showing the various parts of the machine during operation.
Fig. 9 is a front view of the seam-pressing instrumentalities as seen looking in the direction of the arrow IX on Fig. 8.
Figures 10, 11:
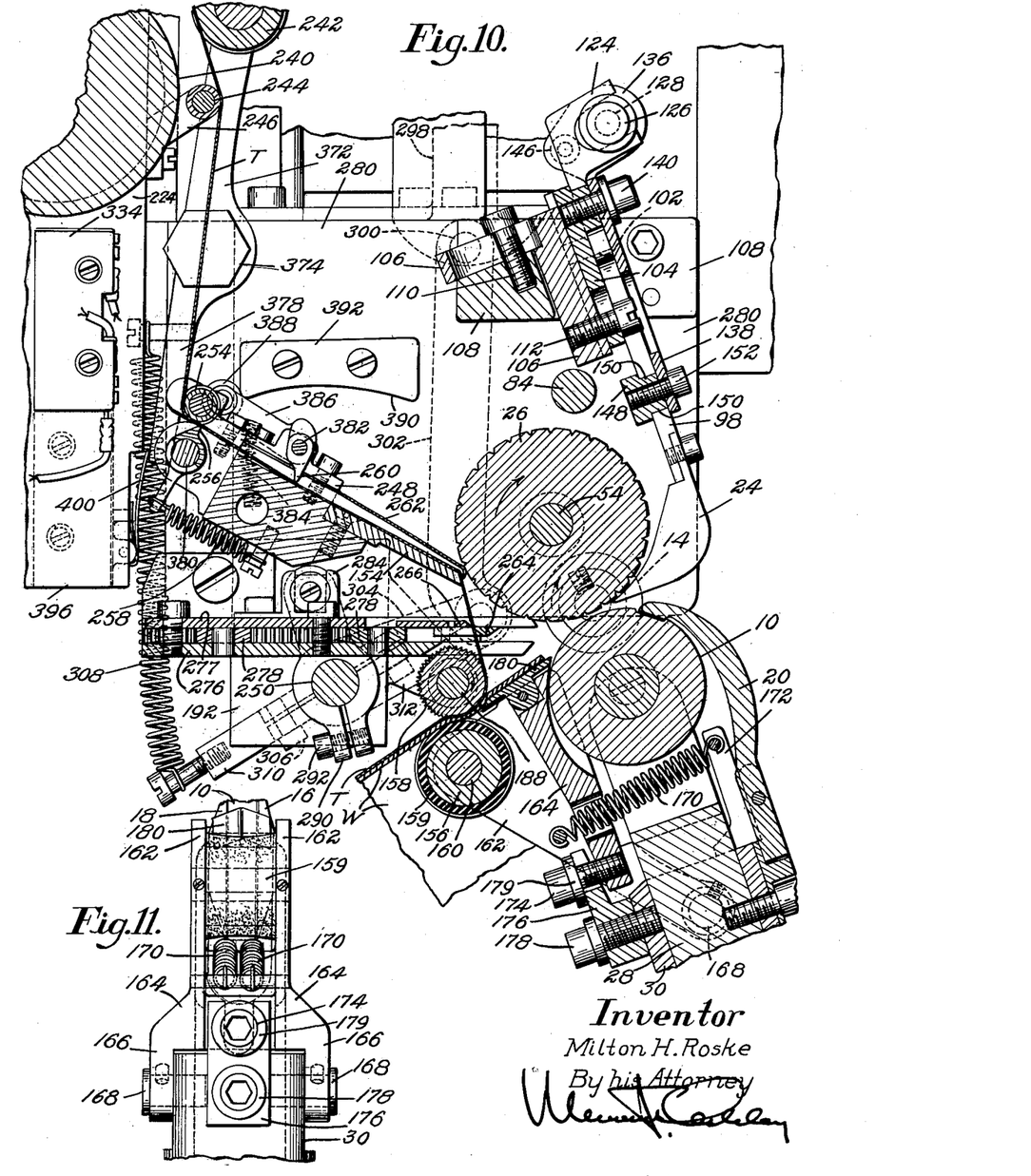
Fig. 10 is a view similar to Fig. 8 showing the various parts of the machine at a later stage of the operation.
Fig. 11 is a rear view of the parts shown in Fig. 9.

The illustrated machine is provided with a work supporting disk 10 (Figs. 8, 9 and 10) having a smooth periphery over which the workpiece W is fed by a pair of feed wheels 12 and 14 (Figs. 1 and 9). The feed of the workpiece W over the supporting disk 10 is facilitated by a pair of idler disks 16 and 18 having beveled margins, these idler disks being coaxial with the disk 10 and abutting the opposite side faces thereof. The workpiece W, in its passage over the work supporting disk, is guided by a seam crease guide 20 and a pair of seam ridge guides 22 and 24 (Fig. 2). As the workpiece W passes over the supporting disk 10, a large diameter rubbing or pressing roll 26 (Figs. 6, 8, 9 and 10) operates upon the seam to flatten the seam and, as the workpiece continues its passage through the machine, other instrumentalities, later to be described, apply a strip of adhesive tape to the seam and cut the tape to a predetermined length.

The work supporting disk 10 and the idler disks 16 and 18, and also the seam crease guide 20, are all mounted upon the upper portion of a plunger 28 (Figs. 5, 8 and 10) which is slidable heightwise in a guideway formed in an upstanding tubular arm 30 of a carrier bracket 32. The disks 10, 16 and 18 and the guide 20 are urged up by a spring 34 (Fig. 5) acting upon the plunger 28 to hold the workpiece yieldingly against the pressing roll 26. The upper limit of the position of the disks 10, 16 and 18 when there is no work in the machine is adjustably determined by turning a cup-shaped member 36 having a knurled periphery. The compression of the spring 34 is adjusted by turning a screw 38 having a knurled head, said screw being held in adjusted position by a lock nut 40. These adjustments are independent, neither having any effect upon the other. For convenience in operating on closed uppers, the carrier bracket 32 is fulcrumed for tilting movement upon a stationary pin 42 mounted in a base portion 44 of the machine frame, and it can be swung by means of a handwheel 46 (Fig. 7) having a shaft 48 to bring the disks 10, 16 and 18 into and out of operating position. Stops 47 and 49 determine the limits to which the bracket 32 may be moved.

The illustrated machine, as so far described, is substantially like that disclosed in the above-mentioned Letters Patent No. 2,513,464, to which reference may be had for a more complete disclosure. The illustrated machine, furthermore, resembles the machine of said Letters Patent in certain other features now to be described.

The frame of the illustrated machine is similar to that of the machine disclosed in said Letters Patent and comprises the base 44 (Fig. 1) adapted to be secured to a work bench, a column 50 extending up from the right-hand end of the base, and a substantially horizontal arm 52 extending to the left from the upper portion of the column and overhanging the base.

The seam pressing roll 26 is fixed on a shaft 54 (Fig. 1) which is journaled in suitable bearings in the arm 52 of the frame. A pulley 56 on the shaft 54 is driven directly by a belt 58 from a pulley 60 on the shaft of a motor 62.

The feed wheels 12 and 14 are driven at reduced speed by gearing from the seam pressing roll shaft 54. Enclosed within a housing 64 through which the shaft 54 passes are reduction gears (not shown) which drive a gear 66 outside the housing. The gear 66 drives a gear 68 on the right-hand end of a shaft 70 journaled in suitable bearings in the frame arm 52. The feed wheel 14 is mounted on the left-hand end of the shaft 70 and is urged to the left to bear yieldingly against the work by a spring 72 interposed between a collar on the shaft and one of the shaft bearings to slide the shaft axially. A suitable stop collar (not shown) on the shaft 70 limits the movement of the latter to the left when no work is in the machine.

The feed wheel 12, coaxial with the feed wheel 14 and on the opposite side of the seam pressing roll 26, is mounted on the right-hand end of a short shaft 74 (see also Fig. 4) having a bearing in a bracket 76 which is secured to and spaced from the left-hand end of the frame arm 52. The left-hand end of the shaft 74 carries a gear 78 which is driven, through an idler gear 80, by a gear 82 on the left-hand end of a long shaft 84 journaled in suitable bearings in the bracket 76 and the frame arm 52. A gear 86 on the right-hand end of the shaft 84 is driven, through an idler gear 88, by the gear 68. The short shaft 74 is slidable axially in its bearing and is urged to the right by a spring 90 acting through a lever 92 which has abutting engagement with the end of the shaft 74. The lever 92 is fulcrumed upon a pin 94 which, for convenience, is mounted between a pair of ears extending from a stationary pin which serves also as a bearing for the idler gear 80. Movement of the feed wheel 12 to the right when no work is in the machine is limited by engagement of the gear 78 with the bracket 76, the gear 78 being axially adjustable along the shaft 74 to enable the limit of the position of the feed wheel 12 to be varied.

The seam ridge guides 22 and 24 are rigidly secured upon the lower ends of a pair of depending arms 96 and 98 (Fig. 2) fulcrumed upon pins 100 and 102 for movement of the seam ridge guides toward and from each other. The pins 100 and 102 are secured in a plate 104 (see also Fig. 10) which has a tongue and groove engagement (Fig. 3) with an L-shaped bracket 106 adjustably secured upon a stationary bracket 108 occupying the space between the left-hand end of the frame arm 52 and the bracket 76. The L-shaped bracket 106 is adjustable forward and rearward on the bracket 108 and is held in adjusted position by a clamping screw 110. The plate 104, by reason of its tongue and groove engagement with the bracket 106, can be adjusted up and down with respect thereto, and is secured in adjusted position by a clamping screw 112. The L-shaped bracket 106 is so inclined from the horizontal and vertical as to provide a somewhat downward and forward inclination for the plate 104 and the arms 96 and 98 as they extend down.

The seam ridge guides 22 and 24 are urged yieldingly toward each other by compression springs 114 and 116. The spring 114 is interposed between an upward extension 118 of the arm 96 and a disk 120 on the end of a screw 122. The spring 116 is similarly interposed between an upward extension 124 of the arm 98 and a disk 126 on the end of a screw 128. The screws 122 and 128 have knurled heads 130 and 132 by which they can be turned to adjust the compression of the springs 114 and 116, and they are threaded through ears 134 and 136 extending up from a cover plate 138 clamped by a screw 140 to a boss 142 extending out from the plate 104. Movement of the seam ridge guides 22 and 24 toward each other when no work is in the machine is limited by a pair of stop screws 144 (Fig. 3) and 146 threaded through the ears 134 and 136 and having their ends engaging the upward extensions 118 and 124. A cross bar 148 (Fig. 8) having a spacer boss 150 is clamped to the cover plate 138 by a screw 152 to support the arms 96 and 98 against the rearward drag by the work.

The machine as so far described, except for the tape applying instrumentalities briefly mentioned, is generally similar to the machine disclosed in Letters Patent No. 2,513,464 already referred to. The tape applying instrumentalities now to be described are, however, new both in themselves and also in combination with the parts already described.

When there is no workpiece W passing through the machine, an end portion T' (Fig. 12) of the tape T hangs from a tape presenter or guide 154 (see also Figs. 8 and 10) in readiness to be picked up by the leading edge of the next workpiece W and carried with the workpiece between an idler spring pressed supporting roll 156 and a driven applying roll 158. The supporting roll 156 yieldingly supports the workpiece W with the tape T, adhesive side down, over the seam of the workpiece; and as the tape and the workpiece thus advance together, the supporting roll 156 presses the workpiece and the tape up against the applying roll 158 with a force sufficient to cause the tape to adhere to the workpiece.

The supporting roll 156 has a facing of rubber 159 and is carried by a shaft 160 journaled in a pair of ears 162 of a bracket 164 having another pair of ears 166 (Figs. 8, 1 and 5) which embrace the tubular arm 30 and are pivotally attached thereto by coaxial pins 168. The supporting roll 156 is yieldingly urged toward the applying roll 158 by a pair of tension springs 170 (Figs. 8, 9 and 10) anchored at their forward ends to brackets 172 secured upon the tubular arm 30 and attached at their rear ends to the ears 162. The extent to which the supporting roll 156 can approach the applying roll 158 under the influence of the springs 170 when no work is in the machine is adjustably determined by a stop screw 174 (Fig. 10) threaded into the bracket 164 and passing loosely through a slot in a small bracket 176 rigidly secured upon the tubular arm 30 by a screw 178. The stop screw 174 has a collar 179 which engages the outside of the small bracket 176 to limit the upward and forward movement of the supporting roll 156 about the axis of the pivot pins 168.

An intermediate work support 180 having a smooth upper surface for engaging the workpiece W is secured by a pin 182 (Fig. 5) in the bracket 164 between the supporting roll 156 and the supporting disk 10.

Figure 13:
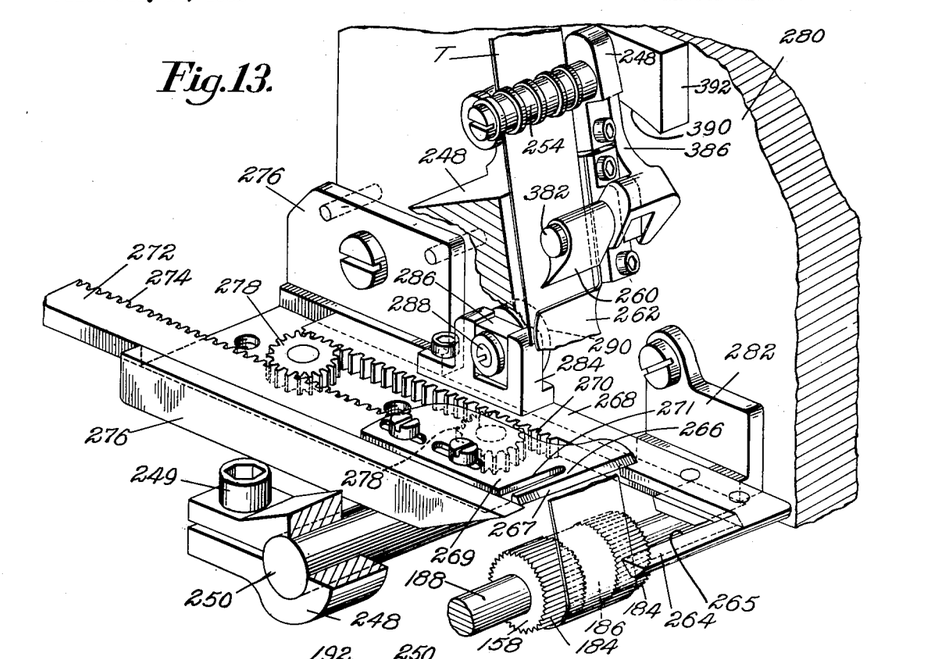
Fig. 13 is an angular view of the tape controlling and cutting mechanism.

The tape applying roll 158 (Fig. 13) is of metal and it has end portions 184 which are cylindrical and serrated, and an intermediate portion 186 in the form of a smooth shallow groove which presses the tape upon the flattened seam of the workpiece while the serrated end portions bear down upon the tape on opposite sides of the seam and help to feed the workpiece. The tape applying roll 158 is secured upon a shaft 188 journaled in the bracket 76 and also in a bearing 190 (Fig. 1) carried by an extension of a bracket 192 mounted on the arm 52 of the machine frame. The tape applying roll 158 is driven by a gear 194 (Fig. 4) on the shaft 188 in mesh with an idler gear 196 which is driven by the gear 78.

The tape T is supplied in the form of a coil (see Fig. 1) which is loosely supported in the illustrated machine between a pair of disks 198 and 200. The disk 200 has a hub 202 which extends within the large central opening of the coil of tape. The disks 198 and 200 are slidable axially on a horizontal pin 204 supported by a bracket 206 mounted on the arm 52 of the machine frame. A compression spring 208 backed by a collar 209 on the pin 204 holds the disk 198 lightly against the coil of tape and thus holds the coil against the disk 200.

The tape T, on its way from the coil to the locality at which it is applied to the workpiece W, passes over a roll 210 (Fig. 12) rotatable on a pin 212 and through a guide 214 secured on the pin 212 and engaging the lateral edges of the tape to maintain the tape in a desired path. The tape T is held against retrograde movement by a pawl 216 which presses the tape against the roll 210. The pawl 216 is fulcrumed upon a pin 218 and has an arm 220 engaged by a tension spring 222 to hold the pawl in operative position. The pins 212 and 218 are secured upon, and the spring 222 is anchored to, a bracket 224 mounted on the arm 52 of the machine frame.

Figures 15, 16, 17:
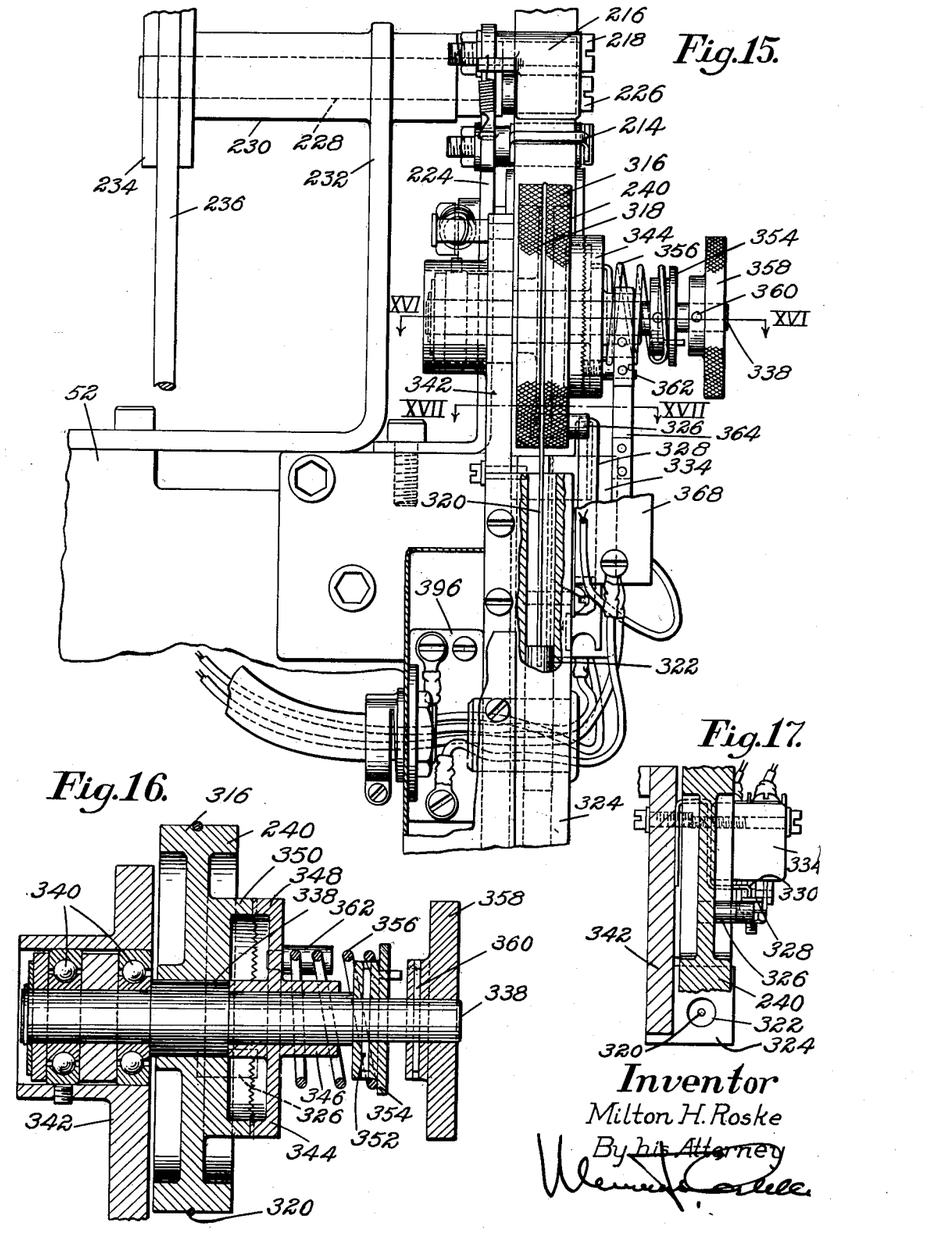
Fig. 15 is a rear elevation of the tape-measuring mechanism.
Fig. 16 is a section taken on the line XVI—XVI of Fig. 15.
Fig. 17 is a section taken on the line XVII—XVII of Fig. 15.

In order to loosen the tacky tape T from its coil so that it can feed freely, there is provided an eccentric pin 226 (Figs. 4 and 15) carrying an anti-friction roll which engages the tape between the coil and the pawl 216. The eccentric pin 226 is secured in a shaft 228 journaled in a bearing 230 supported by a bracket 232 mounted on the arm 52 of the machine frame. The shaft 228 carries a pulley 234 which is driven by a belt 236 from a pulley 238 (Fig. 1) on the shaft 54. The eccentric pin 226 is thus driven in a circular path and caused to beat against the taut tape and pull a short length of tape loose from the coil with each beat.

After leaving the roll 210 and the guide 214, the tape T passes down between a measuring wheel 240 (Fig. 4) and a presser roll 242 which holds the tape with yielding pressure against the periphery of the measuring wheel. The tape then passes over a guide roll 244 (Fig. 10) idly rotatable upon a pin carried by a bracket 246 mounted on the bracket 224.

The tape T, in its further downward passage, is controlled and directed by devices carried by a composite bracket 248 rigidly secured by a clamping screw 249 upon a rock shaft 250 having a bearing in the bracket 192 (Figs. 1, 4, 8, 10 and 12) and another bearing in a bracket 252 (Fig. 1) mounted on the arm 52 of the machine frame. The tape T enters into the control of the bracket 248 by passing between a roll 254 and a pawl 256 (Figs. 8 and 10), both mounted on the bracket 248. The pawl 256, under the influence of a spring 258, holds the tape against the roll 254 to prevent retrograde movement of the tape. The tape travels thence along a guiding groove in the upper and forward surface of the bracket 248 and passes under a normally inoperative gripper 260 (Figs. 8, 10, 12 and 13) which, as will later be explained, is operated at suitable times to clamp the tape to the base of said guiding groove. The tape guide 154, already mentioned, is a part of the bracket 248 and it has a tape guiding groove which is a continuation of the guiding groove above mentioned. A leaf spring 262 secured on the bracket 248 and having three prongs (Fig. 1) serves as a pawl to hold the tape against the base of the guiding groove at the forward lower end of the guide 154 and to prevent retrograde movement of the tape. The loose end portion T' (Fig. 12) of the tape hangs from the guide 154 in readiness to be picked up by the next advancing workpiece W, whereupon tape will be drawn from its coil and applied to the workpiece by instrumentalities already described.

Figure 14:
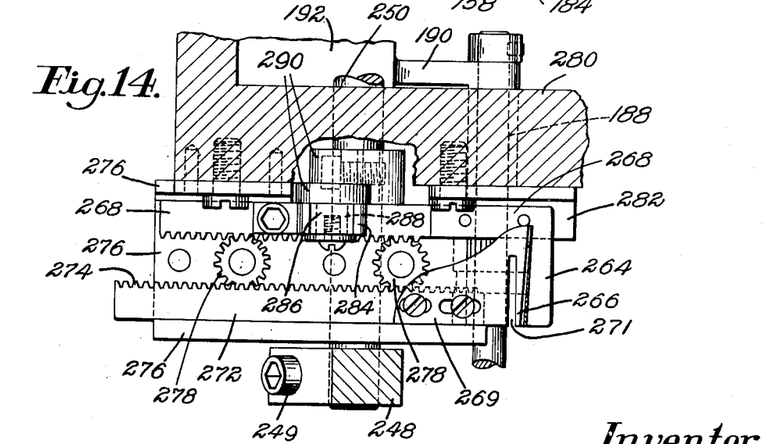
Fig. 14 is a plan view of some of the parts shown in Fig. 12.

Upon the passage of a predetermined length of tape past the measuring wheel 240, means are set into operation for cutting the tape. To this end the machine is provided with two normally separated narrow blades 264 (Figs. 13 and 14) and 266 having cutting edges 265 and 267 respectively down between which the tape guide 154 normally extends. The blade 264 is carried by a slide 268 having rack teeth 270 and the blade 266 is integral with a plate 269 carried by a slide 272 having rack teeth 274, the two slides being guided and coordinated for simultaneous movements in opposite directions by a guide bracket 276 having a cover plate 277 (Fig. 10) and a pair of pinions 278 rotatable about pins upstanding from the base of the guide bracket, each pinion meshing with the rack teeth of both slides. The guide bracket 276 is secured to an end wall 280 of the arm 52 of the machine frame and additional support for the slide 268 is provided by a supplemental bracket 282 also secured to said end wall. The blades 264 and 266 extend in a direction transverse to their path of movement and each blade is supported only at that end which is adjacent to the end wall 280, the blade 266 being separated for the greater part of its length from the main body of the plate 269 by a slot 271. Thus supported, the blades 264 and 266 resiliently bear against each other to insure a desirable cutting action. The cutting edge 267 is inclined at an angle of about four degrees from said transverse direction to provide a relative divergence of four degrees between it and the cutting edge 265 as the two cutting edges extend from the supported ends of their respective blades.

The cutting blades 264 and 266 are operated by mechanism comprising a member 284 secured on the slide 268 and having a guide slot in which is slidable heightwise a block 286 which is pivotally mounted on a pin 288 extending from a crank arm 290 secured by a clamping screw 292 (Fig. 10) to the rock shaft 250.

Actuation of the rock shaft 250 to operate the tape controlling and cutting instrumentalities is effected by a solenoid 294 (Figs. 1, 4 and 12) mounted on the arm 52 of the machine frame. The solenoid 294 has a movable armature 298 which, when the solenoid is in its normal de-energized condition is down in the position shown in Fig. 12. Energizing the solenoid 294 raises the armature 298 above said normal position. Pivotally connected by a pin 300 to the armature 298 is the upper end of a link 302, the lower end of said link being pivotally connected by a pin 303 to the forward end of a crank arm 304 secured by a clamping screw 306 (Fig. 8) to the rock shaft 250. When the solenoid 294 is de-energized, the rock shaft 250 is held in a normal position by a tension spring 308 anchored at its upper end to the arm 52 of the machine frame and hooked at its lower end to a crank arm 310 extending rearwardly from the rock shaft and clamped thereto by a screw 312. The normal position of the rock shaft is determined by a stop screw 314 (Fig. 12) adjustably threaded up through the crank arm 310, the end of the screw engaging an under surface of a portion of the arm 52 of the machine frame.

The solenoid 294 is energized and de-energized by an electrical circuit controlled by the measuring wheel 240 (Figs. 15 and 16) which has a knurled periphery 316 to enable the tape T to exert traction upon the wheel and turn the wheel clockwise in response to the feed of the tape. Formed in the periphery 316 of the measuring wheel 240 is an annular groove 318 engaged by a flexible cable 320 having one of its ends secured to the measuring wheel and its other end depending from the groove and having a cylindrical weight 322 secured thereto. The weight 322 slides up and down in a cylindrical bore of a guide 324 secured to a portion of the arm 52 of the machine frame, and it normally maintains the measuring wheel 240 in an initial position wherein a pin 326 fixed in the measuring wheel and extending from the face thereof holds a switch operating arm 328 (Figs. 4 and 12) against a stationary stop 330. The arm 328 operates a normally open microswitch 332 (shown diagrammatically in Fig. 18) enclosed within a housing 334 secured upon the machine frame member 52. A needle valve 329 (Fig. 12) in the lower portion of the guide 324 holds back enough air to cushion the impact of the pin 326 and the arm 328 against the stop 330 and thereby prevents chattering of the switch 332. A check valve 331 admits air beneath the weight 322 to permit free rising of the weight as the tape T feeds with the workpiece W. The operating arm 328 is resilient enough to yield slightly beyond its operating position so as to bear against the stop 330 under the influence of the weight 322 when the tape T is not feeding. The switch 332 is of the normally closed type, being provided with a compression spring 336 which urges it to closed position, and this switch is held open only by the pressure of the pin 326 against the operating arm 328. As soon as the tape T begins feeding past the measuring wheel 240, it turns the measuring wheel clockwise and causes the pin 326 to move away from the operating arm 328 permitting the switch 332 to close under the influence of its spring 336.

The measuring wheel 240 is rotatably mounted upon a shaft 338 which is journaled in ball bearings 340 (Fig. 16) supported by a bracket 342 on the machine frame arm 52. A disk 344 having an elongated hub 346 is rotatably mounted on a reduced portion of the shaft 338. The disk 344 has a toothed annular cup-shaped flange 348 which engages a toothed annular cup-shaped flange 350 of the measuring wheel 240 to hold the disk yieldingly against turning with respect to the measuring wheel. Rigidly secured by a pin 352 to the shaft 338 is a disk 354. A compression and torsion spring 356 having its ends secured in the disks 344 and 354 respectively holds the teeth of the flange 348 in yielding engagement with the teeth of the flange 350. A hand wheel 358 secured by a pin 360 to the shaft 338 enables the shaft to be turned for an adjustment presently to be explained.

Figure 18:
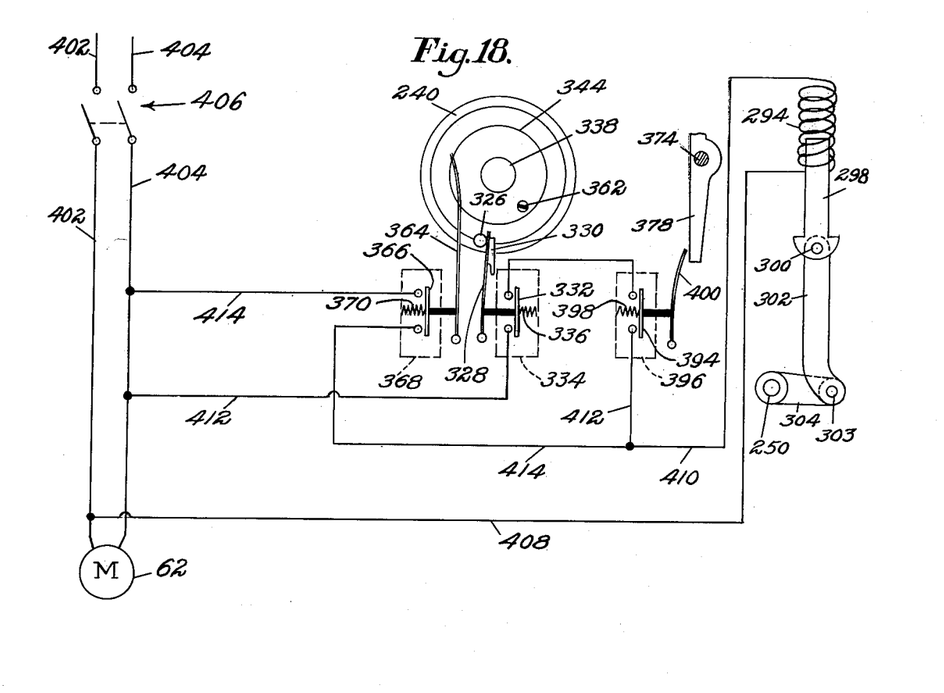
Fig. 18 is a wiring diagram.

Secured in the disk 344 and extending out beyond the face thereof is a pin 362 (see also Figs. 12 and 4) which, as the measuring wheel 240, and with it the disk 354, turns clockwise in response to the feed of the tape T, engages an operating arm 364 of a normally open microswitch 366 shown diagrammatically in Fig. 18. The switch 366 is housed within a casing 368 which is secured to the machine frame member 52. The radial distance of the pin 362 from the axis of the shaft 338 is small enough to enable the pin 362 to clear the tip of the switch operating arm 328 without interference. The pin 326 terminates far enough behind the switch operating arm 364 to clear the latter without interference. The switch 366 is provided with a compression spring 370 which holds the switch open until the pin 362 closes the switch by engagement with the switch operating arm 364.

The pressure roll 242 is mounted for idle rotation upon the upper end of a lever 372 fulcrumed upon a pin 374 secured in the frame arm 52. A tension spring 376 (Fig. 12) anchored at one end to the bracket 342 and secured at its other end to the lever 372 yieldingly holds the presser roll 242 against the tape T and thus causes the presser roll to press the tape against the periphery of the measuring roll 240. The lever 372 has a tail 378 depending below the fulcrum pin 374 and engaged by a pin 380 on the bracket 248 when the rock shaft 250 turns counterclockwise. The pin 380 serves, incidentally, as a fulcrum for the pawl 256. When the pin 380 engages the tail 378, the presser roll 242 is moved away from the measuring wheel 240 and the measuring wheel is released from the traction of the tape T.

The gripper 260 is fulcrumed upon a pin 382 (Figs. 8, 10 and 12) secured on the bracket 248. A compression spring 384 (Figs. 8 and 10) housed in a bore in the bracket 248 bears against a tail 386 (see also Fig. 13) of the gripper 260 to urge the gripper against the tape T with a force sufficient to clamp the tape against the base of the groove in which the tape is guided and hold the tape against movement relative to the bracket 248. A roll 388 (Fig. 10) on the end of the tail 386 normally engages a cam surface 390 formed on the lower edge of a plate 392 secured to the end wall 280 of the frame arm 52, the cam being arranged normally to hold the gripper 260 out of engagement with the tape. When the rock shaft 250 turns counterclockwise, the roll rides off the cam 390 and permits the gripper 260 to clamp the tape.

The electrical circuit which operates the solenoid 294 includes a third microswitch 394, shown diagrammatically in Fig. 18. This switch 394 is enclosed in a casing 396 (Figs. 8 and 10) and is yieldingly held open by a compression spring 398. The switch 394 has an operating arm 400 (Fig. 8) which, when engaged by the tail 378 upon movement of the lever 372 to release the tape T from the measuring roll 240, causes a circuit through the switch to be closed.

The relation between the three switches, 332, 366 and 394, is shown diagrammatically in Fig. 18. Electric current is supplied by a pair of power lines 402 and 404 under control of a manually operated switch 406, these same power lines serving conveniently to supply current also to the motor 62. A lead 408 connects the power line 402 to one end of the coil of the solenoid 294, and a lead 410 from the opposite end of said coil divides into a pair of branches 412 and 414 in parallel with each other, which branches both terminate in connections to the power line 404. The switches 332 and 394 are both interposed in the branch 412 and are in series with each other; and the switch 366 is interposed in the branch 414.

Figure 12:
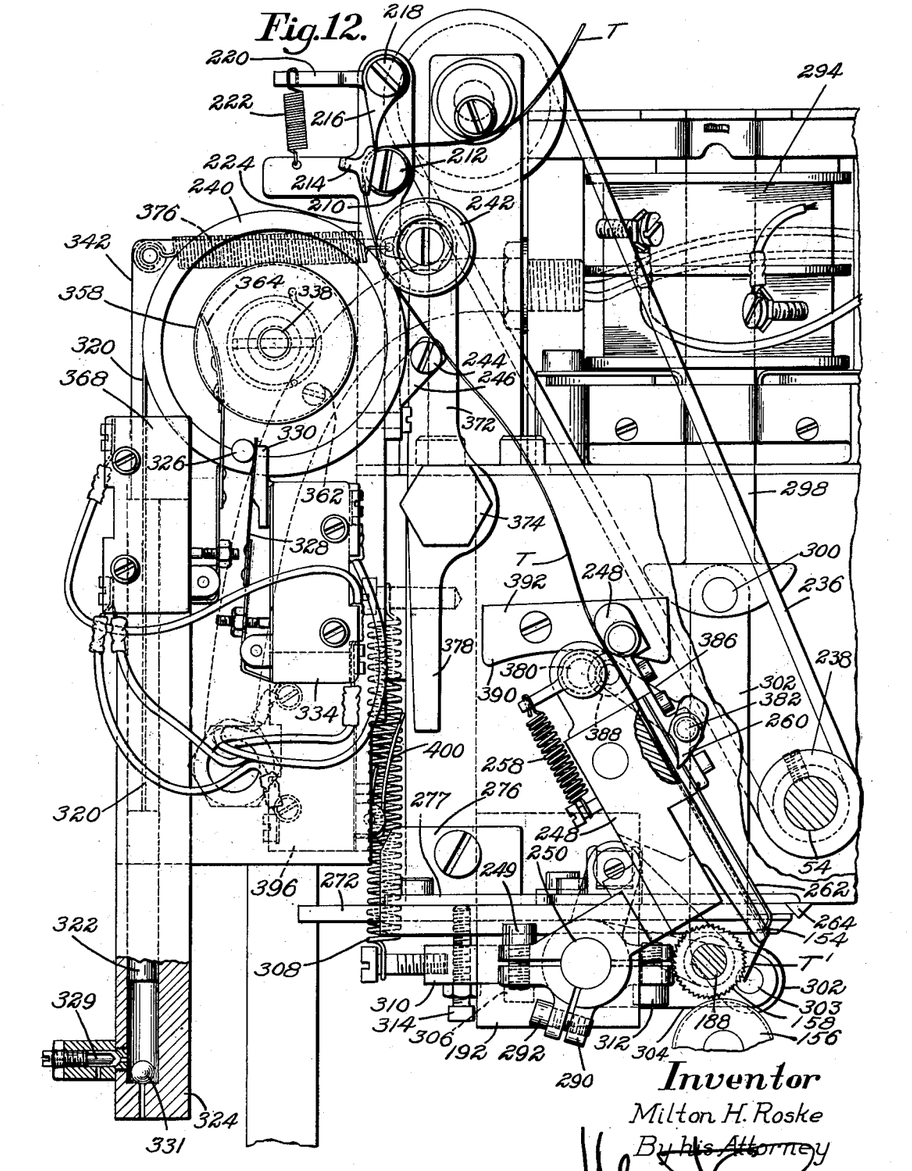
Fig. 12 is a side elevation of the machine with some parts removed.

The operation of the machine will now be described. With the general control switch 406 (Fig. 18) closed and the machine running idly, the work support carrier bracket 32 should be brought into its operative position (if it is not already in that position) as shown in broken lines in Fig. 5. The tape controlling bracket 248 and the guide 154 extending therefrom will occupy the positions in which they appear in Fig. 12, with the lower end portion T' of the tape hanging in a position to be picked up and advanced by the next workpiece W. The position of the lower end of the portion T' can be adjusted up or down, if necessary, by turning the stop screw 314. Also as shown in Fig. 12, the pin 326, under the influence of the weight 322, is holding the switch arm 328 against the stop 330, with the switch 332 open.

Figure 4:
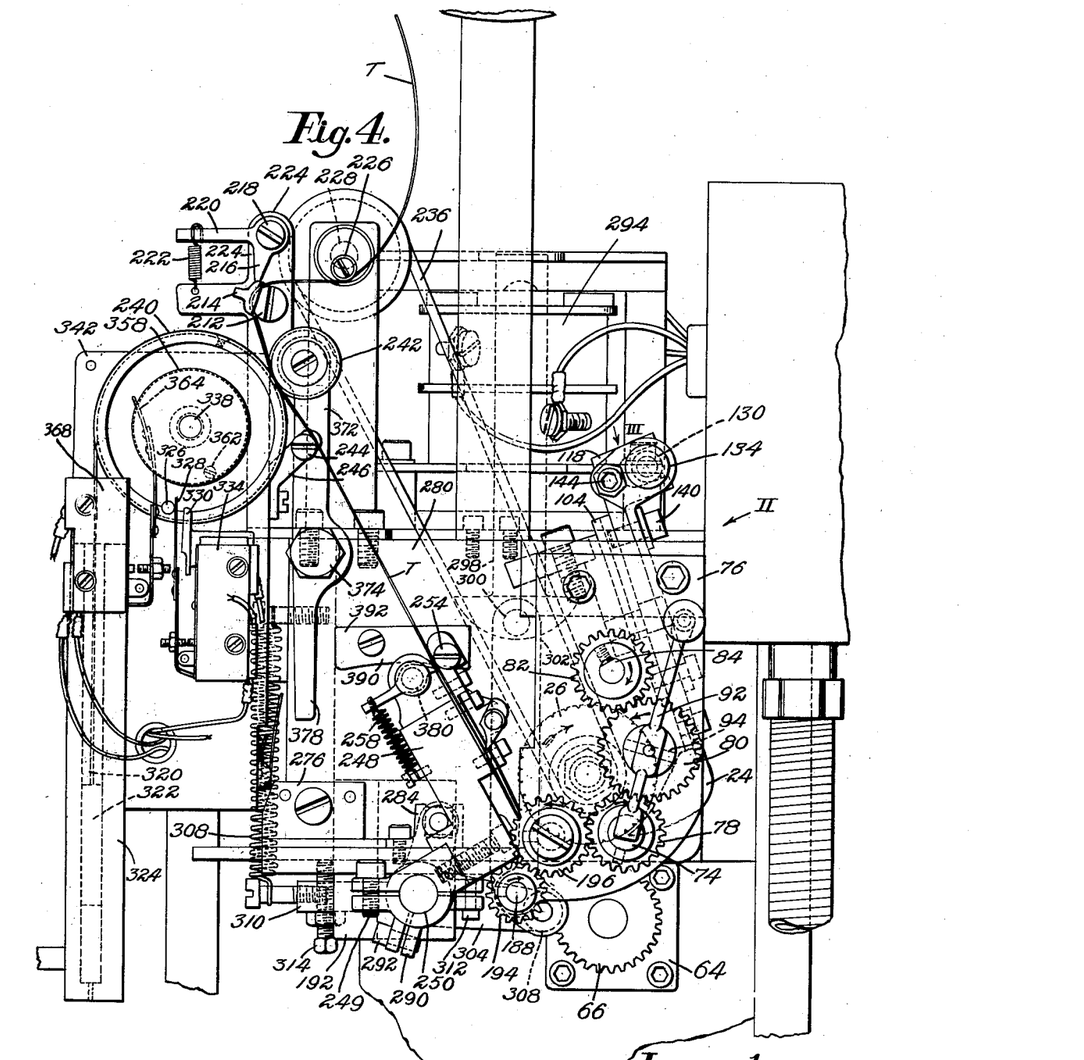
Fig. 4 is a side elevation of the upper portion of the machine with the work support removed, showing the positions of the various parts just after the feed of the tape has begun.
Figures 5, 6, 7:
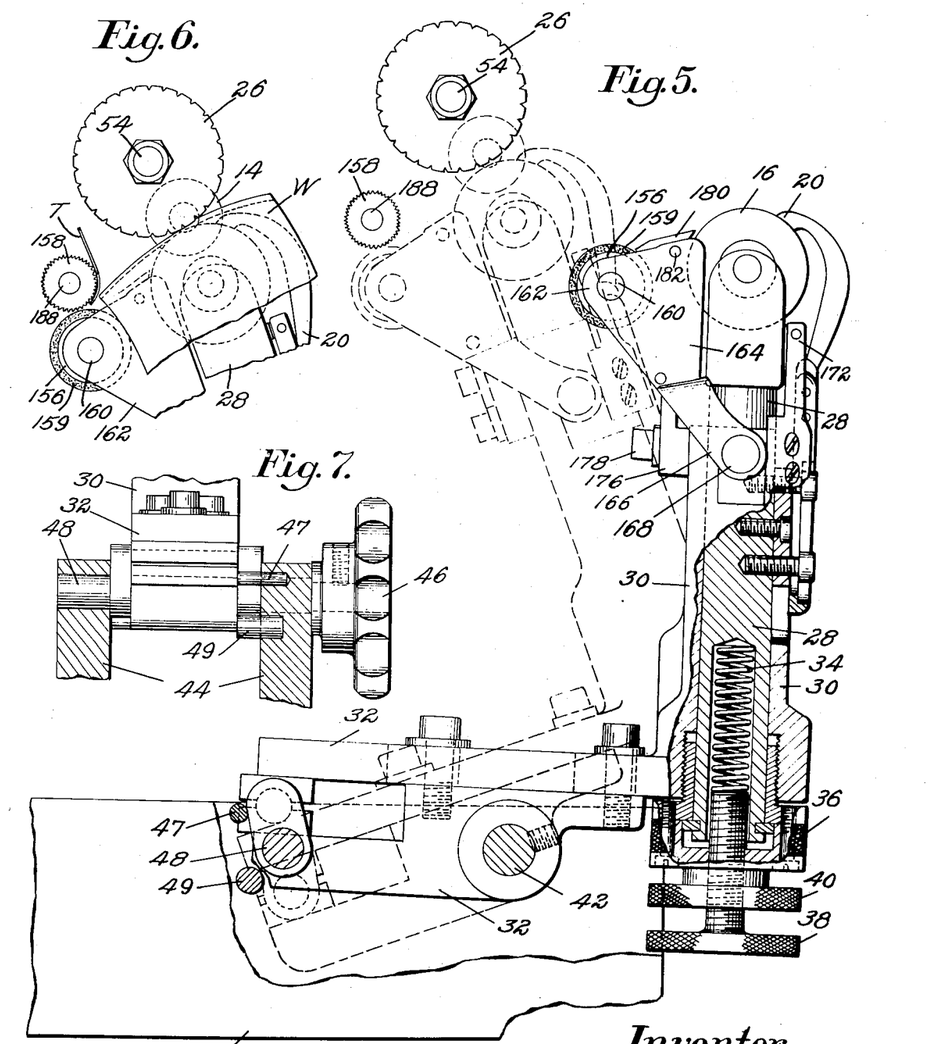
Fig. 5 is a side elevation of the lower portion of the machine showing the work support in its out-of-the-way and operating positions.
Fig. 6 is a view in side elevation of the operating instrumentalities in engagement with the work.
Fig. 7 is a rear elevation of the mechanism for holding the work support in its operative and out-of-the-way positions.

Upon the introduction of a workpiece W into the machine, the workpiece, as it is advanced by the feeding instrumentalities, will engage the hanging portion T' of the tape and carry it along, drawing a run of tape from the coil between the disks 198 and 200, while the upward thrust of the roll 156 will cause the workpiece to press the tape against the roll 158 and cause the tape to adhere to the workpiece. The tape, as it is thus fed, will rotate the measuring wheel 240 clockwise and cause the pin 326 to move away from the switch arm 328 as shown in Fig. 4, permitting the spring 336 (Fig. 18) to close the switch 332 and hold it closed. Such closing of the switch 332 has no immediate effect because the switch 394 is still open. Continued feeding of the tape will rotate the measuring wheel 240 until the pin 362 engages the switch arm 364 and thereby closes the switch 366, which will be referred to as the energizing switch, to energize the solenoid 294. The shaft 250 is then rocked counterclockwise, causing the tape guide 154 to rise from a position between the knives 264 and 266, as shown in Fig. 8, to and slightly beyond the position, shown in Fig. 10, wherein the tape is cut by the knives. The length of the strip of tape to be applied to the workpiece W is predetermined by an adjustment of the angular position of the pin 362 relative to the pin 326 about the axis of the measuring wheel 240. The operator makes this adjustment by turning the hand wheel 358 counterclockwise, such rotation of the hand wheel being transmitted through the spring 356 to the disk 344 which carries the pin 362, while the spring yields in compression to permit the teeth on the flange 348 to slip over the teeth of the flange 350; the flange 350 cannot turn because the pin 326 on the measuring wheel 240 bears against the stop 330.

At about the time the tape is cut the roll 388 rides off the cam 390 and permits the gripper 260, under the influence of the spring 384, to grip the tape positively against the base of the tape guiding groove in the bracket 248. A slight further movement of the bracket 248 draws down a small definite length of tape which, but for the gripper 260, might be indeterminate because of slippage past the pawl 256, said pawl being necessarily weak enough to avoid excessive drag when the tape is feeding. During such slight further movement of the bracket 248, the pin 380 strikes the tail 378 and swings the lever 372 clockwise, moving the presser roll 242 away from the measuring roll 240 and thus releasing the measuring roll from the tape. The tail 378, thus moved by the pin 380, strikes the switch arm 400 and closes the circuit through the switch 394, hereinafter termed the holding switch. Since the switch 332, in series with the holding switch 394, has already closed under the influence of its spring 336, the solenoid 294 is now maintained energized independently of the switch 366.

As soon as the measuring roll 240 has been released from the tape, it begins to turn counterclockwise under the influence of the weight 322. The pin 362 thus backs away from the switch arm 364 and permits the energizing switch 366 to open; however, as already pointed out, the switches 394 and 332 in parallel with the switch 366 are both closed at this time and they serve to maintain the solenoid 294 energized while the measuring wheel 240 continues its counterclockwise return movement. Just as the measuring wheel 240 completes its return movement, the pin 326 strikes the switch arm 328 and opens the switch 332, thereby opening the holding circuit and de-energizing the solenoid 294. The switch 332 is accordingly termed the de-energizing switch.

As soon as the solenoid 294 has been de-energized, the spring 308 begins to rotate the shaft 250 clockwise. The cutting blades 264 and 266 thereupon begin to open and the tape controlling bracket 248 turns clockwise with the shaft 250. Almost immediately the pin 380 backs away from the tail 378 and permits the spring 376 to cause the roll 242 to press the tape against the measuring wheel 248. Shortly thereafter, the roll 388 engages the cam 390 and causes the gripper 260 to release the tape to the control of the more lightly pressed pawls 256 and 262. By the time the tape presenter 154 has descended to the level of the cutting blades 264 and 266, these blades will have opened wide enough to permit the presenter to descend between them. The return movements of the tape controlling bracket 248 and the blades 264 and 266 are terminted by the engagement of the stop screw 314 with the under surface of the frame arm 52. All parts are now in their initial positions, and the machine is ready for another operation.

Having thus described my invention, what I claim as new and desire to secure by Letters Patent of the United States is:

1. In a machine for applying reinforcing material to the back seams of shoe uppers, means for feeding a workpiece consisting of two quarters joined by a back seam, means for progressively applying a run of tape of indefinite length to the workpiece as the workpiece by its feeding movement draws the tape from a source of supply, a measuring wheel normally in driving engagement with the tape and rotated thereby from an initial position as the tape is drawn by the workpiece, a cutter for severing the tape, means for operating the cutter actuated upon rotation of the measuring wheel a definite amount, means operable in response to the action of said cutter operating means for freeing the measuring wheel from driving engagement with the tape when the tape is severed, means for rotating the measuring wheel back to its initial position when it has thus been freed, and means actuated in response to the return of the measuring wheel to initial position for advancing the cut end of the tape to a position for application to the next workpiece to be fed by the feeding means and for restoring the normal driving engagement between the tape and the measuring wheel.

2. In a machine for applying reinforcing material to the back seams of shoe uppers, means for feeding a workpiece consisting of two quarters joined by a back seam, means for progressively applying a run of tape of indefinite length to the workpiece as the workpiece by its feeding movement draws the tape from a source of supply, a measuring wheel normally in driving engagement with the tape and rotated thereby from an initial position as the tape is drawn by the workpiece, a cutter for severing the tape, a solenoid for operating the cutter, a switch closed by the measuring wheel upon rotation thereof a definite amount to energize the solenoid and thereby operate the cutter, means operable in response to the action of said cutter operating solenoid for freeing the measuring wheel from driving engagement with the tape when the tape is severed, means for rotating the measuring wheel back to its initial position after it has thus been freed, a switch opened by the measuring wheel upon its return to initial position to deenergize the solenoid, and means operable upon deenergization of the solenoid for advancing the cut end of the tape to a position for application to the next workpiece to be fed by the feeding means and for restoring the normal driving engagement between the tape and the measuring wheel.

3. In a machine for applying reinforcing material to the back seams of shoe uppers, means for feeding a workpiece consisting of two quarters joined by a back seam, means for progressively applying a run of tape of indefinite length to the workpiece as the workpiece by its feeding movement draws the tape from a source of supply, a measuring wheel normally in driving engagement with the tape and rotated thereby from an initial position as the tape is drawn by the workpiece, a cutter for severing the tape, a solenoid for operating the cutter, an energizing switch closed by the measuring wheel upon rotation thereof a definite amount to energize the solenoid and thereby operate the cutter, means operated by the cutter operating solenoid for releasing the measuring wheel from driving engagement with the tape when the tape is severed, means for rotating the measuring wheel back to its initial position after it has thus been released, a holding switch in parallel with said energizing switch and arranged to be closed by the releasing means to maintain the cutter operating solenoid energized while the measuring wheel in returning to initial position permits the energizing switch to open, and a deenergizing switch in series with said holddown switch and arranged to be opened by the measuring wheel upon return of the same to initial position, said deenergizing switch serving when thus opened to break the circuit through the cutter operating solenoid, and means operable upon such de-energizing of the cutter operating solenoid for returning to their initial positions all parts operated by the solenoid.

References Cited in the file of this patent

UNITED STATES PATENTS

| 1,753,497 | Bazzoni | Apr. 8, 1930 |
| 1,755,926 | Leguillon | Apr. 22, 1930 |
| 1,871,119 | Denmire | Aug. 9, 1932 |
| 2,077,797 | Holmes | Apr. 20, 1937 |
| 2,157,916 | Osgood | May 9, 1939 |
| 2,233,424 | McIntire | Mar. 4, 1941 |
| 2,316,884 | Oliver | Apr. 20, 1943 |
| 2,513,464 | Elliott | July 4, 1950 |
| 2,564,901 | Hess | Aug. 21, 1951 |